Jan. 14, 1969  J. L. McKINNEY ET AL  3,421,334
APPARATUS AND METHOD FOR SEPARATION OF HELIUM ISOTOPES
Filed Aug. 10, 1966
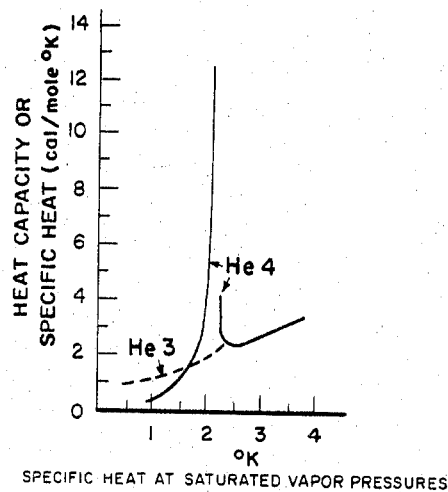
Fig. 1 — SPECIFIC HEAT AT SATURATED VAPOR PRESSURES
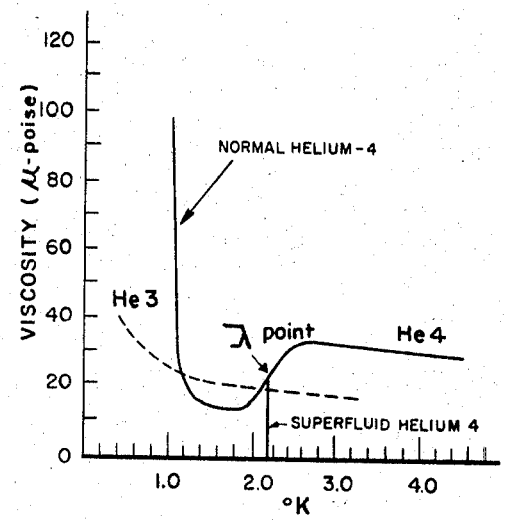
Fig. 2 — VISCOSITY OF LIQUID HELIUM
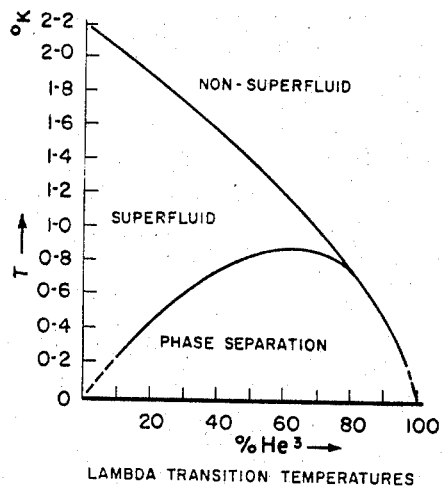
Fig. 3 — LAMBDA TRANSITION TEMPERATURES
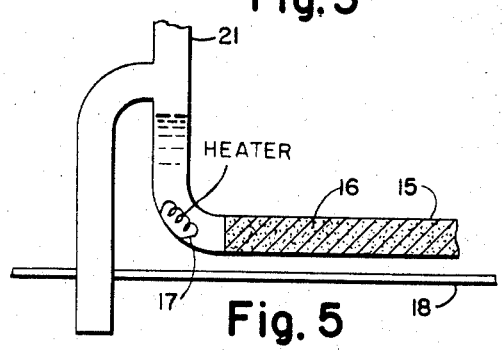
Fig. 5
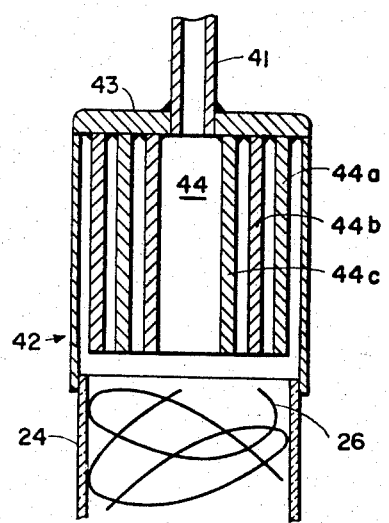
Fig. 6
INVENTORS
John L. McKinney
William L. Taylor INVENTORS
John L. McKinney
William L. Taylor

United States Patent Office 3,421,334
Patented Jan. 14, 1969

3,421,334
APPARATUS AND METHOD FOR SEPARATION OF HELIUM ISOTOPES
John L. McKinney, Dayton, and William L. Taylor, Cincinnati, Ohio, assignors to the United States of America as represented by the United States Atomic Energy Commission
Filed Aug. 10, 1966, Ser. No. 571,652
U.S. Cl. 62—28       3 Claims
Int. Cl. F25j 3/02

ABSTRACT OF THE DISCLOSURE

The separation of helium isotopes from an isotope mixture comprising reducing the mixture temperature until the helium-4 therein partially becomes a superfluid to provide a maximum difference in helium-3 and helium-4 viscosity, filtering a portion of the helium-4 from the mixture through a superleak, heating the remaining mixture to boiling with an adjacent outer helium bath maintained at a pressure and temperature higher than that of said mixure to provide vapors for distillation, and distilling the vapors to produce high purity helium-3.

---

This invention relates generally to the separation of isotopes of helium and more particularly this invention relates to the separation of helium-3 and helium-4 by a novel process comprising a combination of superfluid filtration and low temperature distillation in a novel apparatus.

Helium-3, a very rare gas, is one of the two stable isotopic forms of helium; the other isotope is the more common helium-4. Natural helium, as it occurs in the atmosphere and as it is recovered from natural gas, contains according to some authorities, approximately 0.00013 percent helium-3. The concentration of helium-3 in natural helium may be dependent upon the source, and thus may vary somewhat. Helium-3 is also produced as a byproduct of tritium manufacture in a nuclear reactor. Lithium-6 is bombarded with neutrons to form unstable lithium-7 which decays to tritium and helium-4. The radioactive tritium decays by the emission of a beta particle to stable helium-3. Concentrated or purified helium-3, substantially free from helium-4, is used in fundamental research, in high-energy physics, in cryogenic studies, and in various analytical instruments such as neutron detectors.

Both isotopes of helium possess unique properties not found in any other substance. Of particular importance to the herein disclosed process is the fact that both substances remain in the liquid state under their saturated vapor pressures down to absolute zero. Furthermore, in the temperature region comprising a few degrees above absolute zero the total energy of the bulk liquid is so low that quantum effects, such as superfluidity in helium-4, are observable on a macroscopic scale.

Helium-3 and helium-4 have notable differences in some of their physical properties at low temperatures, and these differences may be used as the basis of separation processes. Helium-3 and helium-4 not only have different masses but possess odd and even numbers of elementary particles in their respective nuclei. Helium-3 also has a nuclear spin of one-half. These fundamental differences have caused considerable interest to be shown in the low temperature properties of the isotopes, especially their liquid state. A brief comparison of some properties is presented in the following table:

|  | Helium-4 | Helium-3 |
|---|---|---|
| Natural abundance (mole percent) | 100 | 0.00013 |
| Atomic mass: | | |
|  Based on $O^{16}$ | 4.0038 | 3.0169 |
|  Based on $C^{12}$ | 4.0026 | 3.0160 |
| Normal boiling point, 760 mm. Hg (° K.) | 4.215 | 3.19 |
| Lambda temperature (° K.) | 2.17 | |
| Latent heat of vaporization at the normal boiling point (cal./mole) | 19.4 | 6.09 |
| Critical constants: | | |
|  T. (° K.) | 5.20 | 3.33 |
|  p (atmos.) | 2.26 | 1.15 |
| Density (g./cc.) | 0.0693 | 0.0413 |

There are several prior art methods for separating helium-3 and helium-4. One method uses thermal diffusion columns. The helium is obtained as a by-product of nuclear reactors and the helium-3 isotope may be refined or enriched to greater than 99 percent in thermal diffusion columns. This process has serious disadvantages: it is both expensive and time consuming and a relatively large (700:1) apparatus is required to handle the gas volume compared to the liquid phase process.

Low temperature distillation and superfluid filtration are other methods used to enrich helium-3 in isotopic mixtures. Neither of the processes alone is sufficiently efficient to enrich helium-3 to a high concentration from a dilute mixture of helium-3 in helium-4. A superfluid filtration enrichment is limited practically by a decreasing lambda transition temperature of the mixture while a low temperature distillation column would be impractical for very dilute mixtures.

The present invention comprises a novel method for separating helium-3 and helium-4 by a combination of superfluid filtration and low temperature distillation in a novel apparatus. This invention comprises a novel process which utilizes known differences in the properties of the two isotopes and which includes elements of both superfluid filtration and low temperature distillation to separate them.

It is an object of this invention to provide a method for separating isotopes of helium.

It is another object of this invention to provide a process for separating isotopes of helium comprising superfluid filtration and low temperature distillation.

It is another object of this invention to provide novel apparatus for carrying out the separation process.

This specification, including the description, drawing, and claims, has been prepared in accordance with the applicable patent laws and the rules promulgated under the authority thereof.

FIG. 1 is a graph of the specific heat of liquid helium-3 and helium-4 at saturated vapor pressures;

FIG. 2 is a graph of the viscosity of liquid helium;

FIG. 3 is a graph of the lambda transition temperature for helium-3 and helium-4 mixtures;

FIGS. 5 and 6 are enlarged views taken from FIG. 4.

Figure 4:
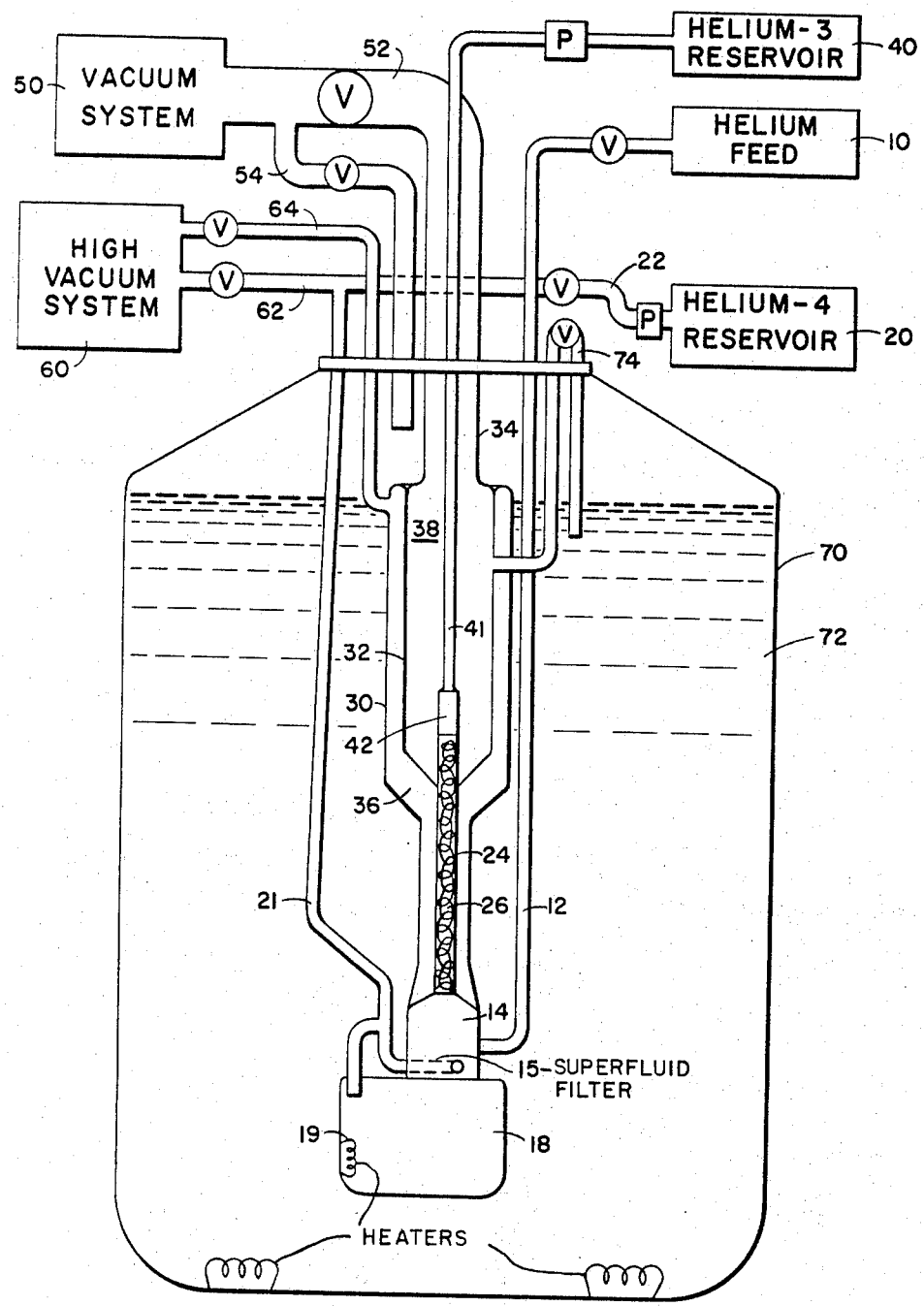
FIG. 4 is a view of the apparatus employed herein.

In FIG. 1 the heat capacity or specific heat of liquid helium-3 and helium-4 at saturated vapor pressures is ploted as a function of temperature. The seeming anomaly in the curve of helium-4 has provided an incentive for increased study of liquid helium. It may also clearly be seen in FIG. 1 how the term "lambda point" originated. The specific heat curve resembles the Greek letter lambda.

The anomaly or thermodynamic transition, which occurs at about 2.17° K., is not a change of state but rather a second order phase transition represented by an increased order in momentum space. Helium-4 remains a liquid on both sides of the transition temperature. To date, there has been no observation of a lambda anomaly in helium-3 down to at least 0.085° K., but helium-3 may exhibit superfluid characteristics at lower temperatures.

The viscosity of the helium isotopes is shown in FIG. 2 as a function of temperature. There appear to be four distinct portions or sections of the graph, one for helium-3 and three for helium-4. The viscosity of helium-3 rises gradually as the temperature decreases. Below about 1.0° K. the viscosity increases rapidly.

The viscosity curves of helium-4, however, are substantially different from that of helium-3. Above the lambda point liquid helium-4 is designated as being in the helium-1 phase and below it is designated as the helium-II phase. In the helium-1 phase the viscosity gradually increases as the temperature decreases until a temperature of about 2.9° K. is reached. The viscosity then decreases at an increasing rate to about 2.173° K., the lambdan point. At this transition temperature or point, the helium-4 may be thought of as comprising two indistinguishable fluids. One component, known as the "superfluid," has zero viscosity. The second component behaves much as a normal fluid. It appears, however, that not all of the helium-4 is immediately transformed to superfluid helium. The viscosity of the normal helium-4, that which is not transformed to a superfluid, continues to decrease below the lambda point, but at a decreasing rate, and at about 2.0° K. it begins to increase at an increasing rate until at about 1.0° K. it rises almost vertically. The graph, however, is somewhat deceiving because it does not indicate quantitatively the transformation process. As the temperature decreases below the lambda point, more of the normal helium is changed to superfluid helium and the net viscosity of the helium-II phase, of course, decreases. Thus, since helium-3 possesses normal viscosity below 2.173° K., but the superfluid component of helium-II (i.e., helium-4 below 2.173° K.) possesses zero viscosity, it is possible to separate helium-3 from helium-4 by a suitable filtration process. However, the fact that not all of the helium-4 transforms to the superfluid state (it is the superfluid which passes through the filter) in the presence of helium-3 necessitates additional means for separating the isotopes.

FIGURE 3 shows the limitations imposed on a filtration process. When helium-3 is mixed with helium-4, the lambda transition temperature of the mixture is lowered. The enrichment of the helium-3 by filtration is therefore limited by the lowest temperature which may be attained in the filtration device. The maximum theoretical enrichment may be obtained by specifying the minimum operating temperature and reading across horizontally to the upper curve in FIGURE 3 to ascertain the percent helium-3 in the product. If the temperature of the device is lowered below approximately 0.9° K. it is possible to obtain phase separation for certain mixtures. The filtration process may then be continued on the helium-4 rich phase and/or product withdrawn from the helium-3 rich phase.

There is a difference of slightly more than one degree K. in the boiling points of the two isotopes, with helium-4 having the higher boiling point. Moreover, the latent heat of vaporization of helium-4 is substantially greater than that of helium-3. These differences make possible a second means for separating the isotopes: a low temperature distillation process.

Neither of the two processes, individually, is capable of a high overall enrichment, but when combined in the novel process and apparatus herein disclosed, high purity isotopic separation is achieved. Experimental data indicate that starting with 0.01 percent helium-3 in a helium-3 and helium-4 mixture, the helium-3 can be enriched to greater than 99.9 percent helium-3 in the apparatus and by the method herein disclosed.

The above discussion on the properties of the isotopes and the graphs of FIGURES 1 to 3 comprise an outline of the parameters which preferably should be considered in the operation of the present process and apparatus.

A novel apparatus employed in separating the helium isotopes is disclosed in FIG. 4. Helium gas, which may be raffinates from thermal diffusion columns, and thus contains about 0.01 percent helium-3, may be stored in a helium feed supply and storage unit 10, and a valved line 12 may conduct the helium feed to a boiler pot 14. In the boiler pot the helium may be condensed to a liquid and cooled below the lambda transition temperature of the mixture. A superleak, which may comprise a capillary tube 15 packed with jewelers' rouge (iron oxide particles) 16 (see FIG. 5), may be connected to the bottom of the boiler pot 14 and may extend circumferentially around the pot and into a collection chamber or dump side 18. A line 21 may extend from the superleak (see FIG. 5) to a T connection with a valved line 62 and a valved line 22 which may also include a pump. The lines 62 and 22 may be connected with a high vacuum system 60 and helium-4 reservoir 20, respectively. A heater 17, which may be a commercial wire wound resistor, may be placed in the superleak adjacent the downstream or lower end of the jewelers' rouge. The purpose of the heater is to provide a temperature differential across the superleak to stimulate flow therethrough. A second heater 19, which may be similar in form to the first one, may be placed in the bottom of the collection chamber 18 for boiling and evaporating the helium-4 therein when it is desired to transfer the helium-4 to the reservoir 20. The heaters 17 and 19 may be embedded in the walls of the capillary tube and collection chamber if desired and their leads may extend through the capillary tube 15, line 21 and out of the apparatus to the required controls and voltage source.

A double wall comprising a substantially cylindrical inner wall 24 and a stepped cylindrical outer wall 30, may extend upwardly from the boiler pot 14. The inner wall 24, open to pot 14, may comprise a fractional distillation column and may include packing 26, which may be stainless steel helices. The helices provide additional surface area for establishing good contact between rising vapors and falling liquid during the evaporative portion of the process.

Flaring outwardly from near the top of the distillation column 24, and extending generally parallel to outer wall 30, may be another inner wall 32. The two walls 30 and 32 may meld into a single upper wall 34 of decreased diameter.

The boiler pot, distillation column, inner, outer, and upper walls, and the collection chamber, may be fabricated of an appropriate material, having the requisite cryogenic and pressure resistant properties, such as "Pyrex" glass, in a double walled Dewar configuration. Feed line 12 may be fabricated of an appropriate material, such as stainless steel. A suitable glass-to-metal seal may be required to connect line 12 to the boiler pot 14.

A conduit 41, which also may be of an appropriate material such as stainless steel, may extend from the top of distillation column 24 to a helium-3 reservoir 40 for conducting helium-3 vapors thereto. Connecting the conduit to the column may be a suitable seal 42. Heat transfer means 44, such as a series of spaced metal cylinders, may be concentrically disposed within the seal, as shown in FIGURE 6. Any appropriate baffle system could be used rather than the cylinders shown in FIGURE 6. FIGURE 6 shows heat transfer means 44 as comprising three cylindrical members 44a, 44b and 44c, concentrically disposed within metal seal 42 and separated from the interior cylindrical wall thereof and from each other to provide a maximum surface area for efficient heat transfer and condensation thereon. The seal 42 and the cylinders 44 may be secured to a cap 43 by conventional means. Conduit 41 may also be secured to the cap by conventional means. The heat transfer means 44 and cap 43, both of which should preferably be fabricated of a suitable non-corrosive metal (with respect to the environment) such as copper, should preferably be in contact with the inner bath 38 in order to efficiently perform the heat transfer function. Helium-4 vapors may condense on the heat transfer means 44 or on the packing 26 and may flow down to the boiler pot 14.

The volume between outer wall 30 and the distillation column 24 and upper wall 32 may comprise a vacuum jacket 36 for thermally insulating, in a somewhat controllable manner, the interior portion of the apparatus and it may be connected to high vacuum system 60 by valved line 64. The apparatus may be inserted within a vacuum jacketed container 70. The container 70 may be filled with liquid helium which may comprise an outer bath 72. Suitable means may be employed to seal the neck of the container 70 to allow for a reduction of the pressure (evacuation) therein. The various conduits and lines may extend through and be sealingly engaged by the seal. The volume within inner wall 32 and surrounding the upper portion of the distillation column 24, seal 42 and conduit 41 connected thereto may comprise an inner bath 38. The inner bath may be connected to the liquid helium supply in the outer bath by a valved line 74.

A vacuum system 50 may be connected to the inner bath space 38 by a valved vacuum line 52 secured to upper wall 34, and to the outer bath space by a valved vacuum line 54. A high vacuum system 60 may be connected by line 64 to the vacuum jacket 36 between inner wall 32 and the outer wall 30. A valved line 62 may connect the high vacuum system 60 with line 21 to the dump side chamber 18.

Operation of the apparatus may commence by filling the container 70 with liquid helium and by sealing the neck of the container. Gaseous helium, which may be enriched in helium-3 as in the case of raffinates from thermal diffusion columns, or which may be naturally occurring helium, may be introduced into the boiler pot 14 from feed source 10. The outer bath may be cooled by evacuating through valved line 54. The gaseous feed may be condensed to a liquid and the liquid helium in both the boiler pot and the outer bath may then be cooled below the lambda point. A portion of the helium-4 may change to superfluid helium when cooled below the lambda point and this superfluid may then flow through the jewelers' rouge 16 in the superleak capillary 15 to the dump side 18. This flow may be made to take place by applying heat to the small heater on the collection side of superleak 16, thereby establishing a thermal gradient across the superleak, and by opening the valve in line 62 to thereby subject line 21 and the superleak to decreased pressure. FIGURE 5 shows that there is a vertical rise in capillary tube 15 between the jewelers' rouge 16 and the collection chamber 18. This vertical rise prevents all of the helium-4 from draining through the superleak to the dump side 18, thus allowing a quantity of helium-4 to remain in the superleak to act as a "priming charge." This priming charge at the downstream side, or output, of the superleak appears to be necessary to make the filtration process work effectively. Similarly, it appears that a thermal gradient across the superleak is desirable in order to accomplish the filtration. The helium-4 in dump side 18 may be periodically removed by warming the outer bath above the lambda point, boiling the helium by means of the heater 19 in the dump side 18, and pumping by means of a suitable pump in line 22, the vapors out through line 21 and through valved line 22 to the helium-4 reservoir 20.

Since not all of the helium-4 becomes superfluid, the liquid helium in the boiler pot 14 may still contain helium-4. The temperature of this mixture of helium-3 and helium-4 in the boiler pot may then be raised to slightly above the lambda point by raising the temperature of the outer bath. The raising of the temperature may be accomplished in any appropriate manner, such as, for example, wire wound resistors placed in the bottom of the outer bath. The inner bath space 38 may then be filled with liquid helium through valved line 74 from the outer bath. The flow of liquid helium may be accomplished by reducing the pressure in the inner bath space 38 through vacuum line 52. Line 74 may then be closed and the liquid helium in the inner bath may be subjected to reduced pressure through line 52. This evacuation may result in the lowering of the temperature of the inner bath to below that of the boiler pot. The warming of the boiler pot may continue in order that the temperature of liquid helium therein may be raised to the boiling point of the isotopic mixture. The evacuated space or vacuum jacket 36 may serve to insulate the column 24 and warming outer bath from the continuing cold inner bath. The boiling point and the latent heat of vaporization of helium-3 is less than that of helium-4, and thus the helium-3 vaporizes faster than the helium-4 and does not condense as readily as the helium-4. The helium-3 may therefore pass more readily through the fractional distillation column 24 and the packing 26 therein which will result in a very high concentration of helium-3 in the vapors in the region of seal 42. This highly enriched material may then be conducted to the helium-3 reservoir 40 through line 41. A pump in line 41 may provide the desired pressure for conducting the helium-3 to the reservoir.

The helium-4, with its higher boiling point and higher heat of vaporization, appears to vaporize slower, condense easier, and thus reflux more readily than helium-3. The temperature of the outer bath may be controlled and adjusted to aid in the evaporation of the mixture. The temperature of the inner bath, however, may be below that of the outer bath and below the boiling point of helium-4 but at a temperature where the relative volatility of helium-3 to helium-4 is large. Thus, the gaseous helium-3 may pass through conduit 41 to a reservoir 40 relatively unimpeded. The helium-4, on the other hand, may condense on the concentric copper cylinders 44 within seal 42 and may flow down the packing 26, thereby returning to the boiler pot 14.

Upon completion of the refluxing, the process may be repeated. An additional charge from helium feed 10 may be added to the boiler pot and the batchwise continuous separation of the isotopes may thus be accomplished.

It may be seen that the novel process and apparatus provides an inexpensive and efficient means for the cryogenic separation of the isotopes of helium-3 and helium-4. Experimental data indicate that helium-3 may be enriched to greater than 99.9 percent using this apparatus and process. Moreover, helium-4 is also quantitatively recovered at an enrichment of substantially 100 percent purity.

We claim:

1. A process for separating isotopes of helium comprising the steps of at least partially filling a boiler pot with helium including helium-3 and helium-4 isotopes, controlling the pressure and temperature of an outer helium bath adjacent said boiler pot for reducing the temperature of the helium in the boiler pot below the lambda temperature so as to cause helium-4 isotopes to assume the properties of a superfluid, filtering a portion of the superfluid helium-4 from the boiler pot through a superleak to a collection chamber, terminating the said temperature reducing step and then controlling the pressure and temperature of said outer helium bath for raising the temperature of the helium isotopic mixture remaining in the boiler pot to above the boiling point of the helium mixture to produce helium-3, helium-4 evaporant in a distilling operation, withdrawing helium from the outer bath to an inner bath in heat exchange with vapor derived from the distillation, controlling the pressure and temperature of said inner helium bath for reducing the temperature of the helium-3, helium-4 evaporant to below the boiling point of helium-4 to cause condensation of helium-4 as reflux during the said temperature raising of the outer helium bath, maintaining a controlled vacuum intermediate said inner and outer baths for thermal insulation, and collecting the evaporated helium-3 as an overhead product.

2. Apparatus for separating isotopes of helium comprising in combination a boiler pot for holding a quantity of helium, means for supplying the boiler pot with a helium mixture including helium-3 and helium-4 isotopes, an outer helium bath means filled with liquid helium disposed about the boiler pot for sequentially cooling said mixture to below the lambda transition temperature to cause helium-4 isotopes to assume the properties of a superfluid and for boiling the mixture to produce helium-3, helium-4 vapor mixture, superleak means for filtering the superfluid helium-4 from the boiler pot, distillation means connected to said boiler pot for receiving said helium-3, helium-4 vapors and for fractionating said vapors into helium-3 and helium-4 isotopes, said distillation means comprising a packed column, a reflux condenser operatively connected to said column and having an outer shell contacting said inner bath, and a plurality of concentric spaced apart cylinders contacting said outer shell to provide heat transfer surface for reflux condensation, an inner helium bath means disposed within said outer bath means and around a portion of said distillation means for condensing a fraction of said helium-4 vapors from said helium-3, helium-4 mixture for reflux, an evacuatable jacket disposed intermediate said outer and inner bath means and intermediate said distillation means and outer bath means, product receiver means for collecting helium-3 rich vapors passing overhead from the distillation means, means for selectively providing and controlling a vacuum to said inner bath means, outer bath means, evacuatable jacket and superleak means.

3. The apparatus of claim 2 wherein said superleak means comprises a capillary tube operatively connected at one end to said boiler pot, a collection chamber surrounded by said outer bath means operatively connected to said capillary tube opposite said boiler pot, a filtering medium disposed in said tube to filter helium-4 from the helium mixture in said boiler pot, means for providing a thermal gradient across said superleak tube, and means for selectively providing and controlling a vacuum to said collection chamber and superleak capillary tube.

References Cited

UNITED STATES PATENTS 2,460,859  2/1949  Trumpler _____ 62—14
3,299,646  1/1967  Stuart et al. _____ 62—9

OTHER REFERENCES

Liquid Helium by K. R. Atkins, Cambridge University Press, 1959, pp. 275–277, 291 and 292.

Cryogenics by Michael McClintock, Reinhold Publishing Corp., 1964.

NORMAN YUDKOFF, *Primary Examiner.*

V. W. PRETKA, *Assistant Examiner.*

U.S. Cl. X.R.

62—9, 14, 40